(12) United States Patent
Doris-Down et al.

(10) Patent No.: US 10,803,462 B2
(45) Date of Patent: *Oct. 13, 2020

(54) METHOD AND APPARATUS FOR USING SENSORS ON A PORTABLE ELECTRONIC DEVICE TO VERIFY TRANSACTIONS

(71) Applicant: PayPal, Inc., San Jose, CA (US)

(72) Inventors: Abraham Doris-Down, Austin, TX (US); Miguel Angel Escobedo, Austin, TX (US); Matthew Wilczynski, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 15/894,123

(22) Filed: Feb. 12, 2018

(65) Prior Publication Data

US 2018/0253729 A1 Sep. 6, 2018

Related U.S. Application Data

(63) Continuation of application No. 15/155,299, filed on May 16, 2016, now Pat. No. 9,892,412, which is a continuation of application No. 14/620,270, filed on Feb. 12, 2015, now Pat. No. 9,349,126, which is a continuation of application No. 13/723,331, filed on Dec. 21, 2012, now Pat. No. 8,978,111.

(51) Int. Cl.
*G06F 21/00* (2013.01)
*G06Q 20/40* (2012.01)
(Continued)

(52) U.S. Cl.
CPC ......... *G06Q 20/4016* (2013.01); *G06F 21/00* (2013.01); *G06Q 20/3224* (2013.01);
(Continued)

(58) Field of Classification Search
CPC ........... G06Q 20/4016; G06Q 20/3224; G06Q 20/40; H04W 24/08; H04W 4/027;
(Continued)

(56) References Cited

U.S. PATENT DOCUMENTS 7,576,633 B2 * 8/2009 McGunn ................. E05F 15/77
340/5.73
8,589,298 B2 11/2013 Choudhuri et al.
(Continued)

FOREIGN PATENT DOCUMENTS

WO WO 2012093393 A1 7/2012

*Primary Examiner* — Kendall Dolly
(74) *Attorney, Agent, or Firm* — Haynes and Boone, LLP

(57) ABSTRACT

An attempt to conduct an electronic transaction using an electronic device is detected. The electronic device contains one or more sensors, such as an accelerometer, an ambient light sensor, a gyroscope, a GPS unit, or a transceiver. In response to the detected attempt to conduct the electronic transaction, an analysis is performed using data gathered by the one or more sensors to estimate one or more current statuses of the electronic device. The estimated one or more current statuses of the electronic device are compared with one or more expected statuses of the electronic device according to a model. An alert is generated in response to the comparison indicating that some of the estimated current statuses of the electronic device are inconsistent with the expected statuses of the electronic device.

20 Claims, 4 Drawing Sheets

(51) Int. Cl.
*H04W 12/12* (2009.01)
*H04W 12/00* (2009.01)
*H04W 12/06* (2009.01)
*H04W 12/08* (2009.01)
*H04W 8/24* (2009.01)
*G06Q 20/32* (2012.01)
*H04L 12/26* (2006.01)
*H04W 4/02* (2018.01)
*H04W 24/08* (2009.01)

(52) U.S. Cl.
CPC .......... *G06Q 20/40* (2013.01); *H04L 43/0811* (2013.01); *H04W 4/026* (2013.01); *H04W 4/027* (2013.01); *H04W 8/24* (2013.01); *H04W 12/00* (2013.01); *H04W 12/06* (2013.01); *H04W 12/08* (2013.01); *H04W 12/12* (2013.01); *H04W 24/08* (2013.01)

(58) Field of Classification Search
CPC ....... H04W 4/026; H04W 8/24; H04W 12/06; H04W 12/00; H04W 12/08; H04W 12/12; H04W 12/1206; H04W 12/0802; H04W 12/00503; H04W 12/00502; H04L 43/0811; G06F 21/00
See application file for complete search history.

(56) References Cited

U.S. PATENT DOCUMENTS

| | | | |
|---|---|---|---|
| 8,646,060 B1* | 2/2014 | Ben Ayed | H04L 63/0853 726/9 |
| 8,718,672 B2 | 5/2014 | Xie et al. | |
| 8,805,613 B2 | 8/2014 | Chainer et al. | |
| 9,336,259 B1* | 5/2016 | Kane | G06F 11/0793 |
| 2008/0046366 A1 | 2/2008 | Bemmel et al. | |
| 2009/0132093 A1* | 5/2009 | Arneson | G06F 1/1616 700/282 |
| 2009/0152343 A1 | 6/2009 | Carter et al. | |
| 2009/0307139 A1 | 12/2009 | Mardikar et al. | |
| 2010/0052891 A1 | 3/2010 | Chainer et al. | |
| 2011/0154497 A1 | 6/2011 | Bailey, Jr. | |
| 2011/0251892 A1 | 10/2011 | Laracey | |
| 2012/0264446 A1* | 10/2012 | Xie | G01C 22/00 455/456.1 |
| 2013/0024376 A1* | 1/2013 | Choudhuri | G06Q 40/00 705/44 |
| 2013/0031130 A1* | 1/2013 | Hahm | G06F 16/26 707/769 |
| 2013/0046697 A1* | 2/2013 | Schibuk | G06Q 20/32 705/67 |
| 2013/0110565 A1 | 5/2013 | Means et al. | |
| 2013/0176264 A1* | 7/2013 | Alameh | G06F 3/0418 345/174 |
| 2013/0191908 A1* | 7/2013 | Klein | G06F 21/316 726/18 |
| 2013/0347064 A1* | 12/2013 | Aissi | G06F 21/44 726/2 |
| 2014/0040126 A1* | 2/2014 | Andrews | G06Q 20/351 705/41 |
| 2014/0089243 A1 | 3/2014 | Oppenheimer | |
| 2014/0135644 A1* | 5/2014 | Kim | A61B 5/7455 600/545 |
| 2014/0171013 A1* | 6/2014 | Varoglu | H04W 4/90 455/404.2 |
| 2014/0225718 A1* | 8/2014 | Fadell | H04W 68/005 340/407.1 |

* cited by examiner

METHOD AND APPARATUS FOR USING SENSORS ON A PORTABLE ELECTRONIC DEVICE TO VERIFY TRANSACTIONS

RELATED APPLICATIONS

The present application is a continuation of U.S. patent application Ser. No. 15/155,299, filed May 16, 2016, now U.S. Pat. No. 9,892,412 which is a continuation of U.S. patent application Ser. No. 14/620,270, filed on Feb. 12, 2015, now U.S. Pat. No. 9,349,126 which is a continuation of U.S. patent application Ser. No. 13/723,331, filed on Dec. 21, 2012, now U.S. Pat. No. 8,978,111, the disclosures of each are hereby incorporated by reference in their respective entireties.

BACKGROUND

Technical Field

The present disclosure generally relates to mobile electronic transactions, and more particularly, to detecting and preventing unauthorized access to a mobile electronic device.

Related Art

Recent rapid advances in computer technology and telecommunications have increased the popularity of electronic commerce. Electronic commerce is becoming more and more prevalent, with an ever-increasing number of merchants that may or may not have a physical real world counterpart. Furthermore, the services offered by these merchants have been improving as well. The popularity of electronic commerce is partially attributable to the ease and convenience of making a transaction electronically—for example online—instead of at a physical location. Combining with the recent popularization of mobile electronic computing devices such as smartphones and tablet computers, online transactions are now increasingly performed on mobile devices, which offer greater convenience and simplicity for the buyers. In addition, these mobile electronic devices may be used as mobile wallets, for example they can be used to make payments at physical store locations as well.

Unfortunately, the popularity of mobile electronic transactions has also led to an increase in fraud activities. For example, a person may illegally and surreptitiously obtain access to a victim's mobile electronic devices, and thereafter attempt to purchase goods or engage in other nefarious activities through these devices. To combat these fraudulent activities, various forms of electronic transaction verification mechanisms have been implemented, but they may still suffer from various shortcomings. For example, existing methods of verifying mobile electronic transactions do not sufficiently take into account of the state of the mobile electronic devices, such as its position, movement, exposure to light, etc. As a result, existing electronic transaction verification mechanisms often fall short in detecting and preventing unauthorized access to mobile electronic devices.

Therefore, while existing electronic transaction verification mechanisms have been generally adequate for their intended purposes, they have not been entirely satisfactory in every aspect. It would be advantageous to offer an electronic transaction verification system and method that take into account of a state of a mobile electronic device in determining whether certain electronic transactions are authorized or not.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As mobile electronic and communication technologies continue to advance, electronic commerce is becoming increasingly more prevalent. The popularity of electronic commerce is partially attributed to the ease and convenience associated with conducting electronic transactions such as online purchases. However, as mobile electronic devices are increasingly relied on for performing electronic transactions online, the security and safety of these transactions may become more vulnerable to unauthorized access. For example, a hacker may illegally gain access to a person's mobile electronic device and use that device to perform certain financial transactions, such as conducting unauthorized purchases. As another example, even if no financial transactions are conducted per se, the hacker may still exploit the resources of the victim's mobile electronic device to engage in other nefarious activities, such as piggybacking onto the victim's device to get free internet services or using the computing resources of the victim's device for illicit gain. In these situations, the victim is often unaware that his/her mobile electronic device is being hacked into or otherwise compromised at the time these unauthorized activities are taking place. Nevertheless, the victim may experience performance degradations of the mobile electronic device, or later discover that some authorized transactions are associated with them, which may frustrate the victim and/or discourage the victim from engaging in mobile electronic commerce in the future.

To combat these problems discussed above, the present disclosure describes an improved method and system to detect and prevent unauthorized activities involving mobile electronic devices.

Figure 1:
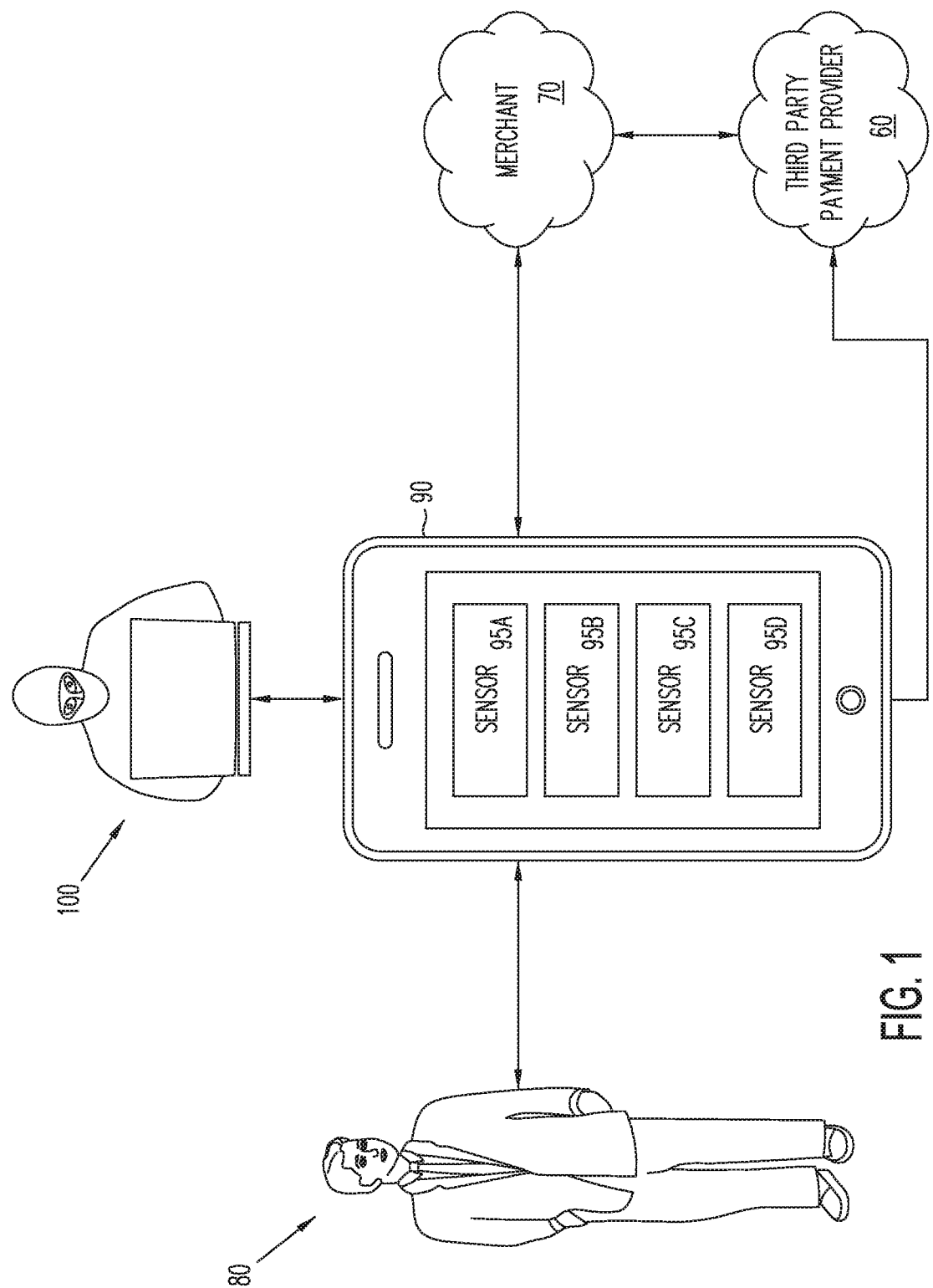
FIG. 1 is a simplified block diagram illustrating an infrastructure for detecting and verifying a transaction or activity involving a mobile electronic device according to various aspects of the present disclosure.

FIG. 1 is a simplified high-level block diagram view of an infrastructure (or system) 50 over which mobile electronic transactions can be conducted and monitored in accordance with the various aspects of the present disclosure. The infrastructure 50 includes a third party payment provider 60, a merchant 70, and a user 80. In some embodiments, the third party payment provider 60 may be a financial institution or a third party payment provider, for example PayPal®, Inc. of San Jose, Calif., or a similar entity. In other embodiments, the third party payment provider 60 may also be a financial institution, such as a bank.

The merchant 70 may be an entity offering merchandise for sale. The merchandise may be a single product, or may actually include a plurality of physical and tangible products, including (but not limited to) clothing, electronics, tools, toys, pharmaceutical products, household appliances, books, movies, automotive components, sporting goods, groceries, etc. The merchant 70 may also be an entity offering digital goods or services, in which case the merchandise for sale may include electronic-books, digital music, digital images, digital videos, virtual items, or other subscription-based services, etc. The merchant 70 is configured to conduct electronic communication with external entities, for example the third party payment provider 60. The electronic communication may take place over an electronic network, which may include a wired network or a wireless network implemented according to a communications protocol now known or later developed.

The user 80 is someone who owns a mobile electronic device (or a mobile computing device) 90. The user 80 may also electronically communicate with external entities (e.g., the third party payment provider 60 or the merchant 70) through the mobile electronic device 90. In the embodiment shown, the mobile electronic device 90 includes a mobile smartphone, for example an PHONE®, an ANDROID® phone, a WINDOWS® phone, a BLACKBERRY® phone, or another suitable smartphone. In other embodiments, the mobile electronic device 90 may include a tablet computer (also referred to as a computer tablet). These may include an IPAD®, and ANDROID® tablet, a WINDOWS® tablet, or a PLAYBOOK® tablet. In any case, the mobile electronic device 90 may contain electronic circuitry and software implemented therein that enables communication with one or more computers of the external entities under a suitable wired or wireless telecommunications protocol.

The mobile electronic device 90 also includes a plurality of sensors 95A-95D. These sensors 95A-95D may include, but are not limited to: ambient light sensors, image sensors, proximity sensors, temperature sensors, location sensors, noise sensors, gyroscopes, accelerometers, barometers, GPS (Global Positioning System) units, transceivers, and compasses. These sensors 95A-95D gather sensor data that can be used to estimate a current or actual state of the mobile electronic device. For example, an ambient light sensor can be used to detect whether the mobile electronic device 90 is placed in a dark environment (e.g., inside a pocket of the user 80) or a well-lit environment (e.g., taken out of the pocket of the user 80). As another example, an image sensor can be used to detect whether anyone (including the user 80) is currently looking at the mobile electronic device 90 or not. As yet another example, a gyroscope sensor can be used to detect an orientation of the mobile electronic device 90 (e.g., is the mobile electronic device 90 facing up or down or sideways?). As one more example, an accelerometer sensor can be used to detect whether the mobile electronic device 90 is stationary or moving.

In certain embodiments, with the user's consent, these sensor data collected from the sensors 95A-95D may be sent to an entity such as the merchant 70 or the third party payment provider 60 for further analysis and modeling. In order to improve the security of mobile electronic transactions, the sensor data may be used by the merchant 70 or the third party payment provider 60 to establish a model that associates an expected state of the mobile electronic device 90 with a given type of transaction.

For example, suppose the user 80 uses the mobile electronic device 90 as a mobile wallet from time to time. In other words, the user 80 may use certain capabilities (e.g., NFC, or Near Field Communications) of the mobile electronic device 90 to make payments at a physical store location. Typically, this involves the user 80 taking the mobile electronic device 90 out of his/her pocket or purse. The sensor data corresponding to such action may include an orientation shift detected by the gyroscope sensor, a burst of movement detected by the accelerometer, and/or an ambient light change detected by the ambient light sensor (especially during daylight hours). Meanwhile, the GPS unit of the mobile electronic device 90 may detect that the mobile electronic device 90 is substantially stationary while the mobile payment is being made. Furthermore, the transceiver inside the mobile electronic device 90 may detect that the mobile electronic device 90 is within the coverage (or is connected to) a particular wireless network, for example a particular Wi-Fi network associated with the store.

As the merchant 70 or the third party payment provider 60 receives such sensor data accompanying these mobile payment transactions, over time they may establish a model that describes the expected state of the mobile electronic device 90 (in terms of the gathered sensor data) that should be associated with the mobile payment transaction. For instance, the model may correlate a mobile payment transaction at a store A with the detection or receipt of one or more of the following sensor data:

a burst of movement right before the transaction;
an ambient light change before or during the transaction;
a particular orientation as the transaction is made (e.g., mobile electronic device 90 facing up);
a stationary GPS signal; and
a connection to the Wi-Fi network of the store A.

This model is established as a result of the same (or substantially similar) kind of sensor data repeatedly being detected before the transaction is made or while the transaction is made. Thus, according to the model, when a request to conduct a mobile payment transaction at store A from the mobile electronic device 90 is received, such request should be accompanied by the same kinds of sensor data discussed above.

Of course, the mobile payment transaction example discussed above is merely one example scenario used to illustrate that models can be established for the expected state of the mobile electronic device 90 with a particular type of transaction. In a similar manner, other models may be established for different types of transaction or activities involving the mobile electronic device 90, wherein each transaction or activity may be accompanied by a particular state of the mobile electronic device expressed as its sensor data. Again, the models may be established and maintained by either the merchant 70 or the third party payment provider 60, or even by another different suitable entity.

Once these models are in place, they can be used to detect and prevent unauthorized access to the mobile electronic device 90 of the user 80. As an example, a hacker 100 may attempt to hack into, or otherwise obtain access to the mobile electronic device 90. Often times, this happens without the knowledge of the user 80. Suppose the hacker 100 gains electronic access to the mobile electronic device 90 and subsequently makes a request to conduct a financial transaction, for example an online purchase of a product from the merchant 70.

Based on the user 80's transactional history with the merchant 70 or the third party payment provider 60 over time, they may have established a model stipulating that an online electronic purchase made by the mobile electronic device 90 is expected to be preceded by the mobile electronic device 90 being taken out of the user 80's pocket or purse (i.e., a burst of movement detected by the accelerometer sensor). In addition, the mobile electronic device 90 should be in a well-lit environment, which can be detected by the ambient light sensor. Furthermore, the image sensor should report a detection of the face of the user 80, because he/she should be looking at the mobile electronic device 90 while the online electronic transaction is made. Therefore, the expected state of the mobile electronic device 90 should include these aforementioned sensor data.

However, in the scenario discussed herein, the user 80 is not attempting to make the purchase. Thus, the mobile electronic device 90 may be still placed in his/her pocket or purse, or is sitting on a desk somewhere. Consequently, the mobile electronic device 90 will report to the merchant 70 or to the third party payment provider 60 that the mobile electronic device 90 is currently stationary, as indicated by the accelerometer sensor. Therefore, the expected state of the mobile electronic device 90 is incongruent with the likely actual state of the mobile electronic device 90, as estimated by the received accelerometer sensor data. In addition, if the mobile electronic device 90 is still in the user 80's pocket or purse, the ambient light sensor will report that the mobile electronic device 90 is currently placed in a dark environment. This leads to another inconsistency between the expected state of the mobile electronic device 90 and the estimated actual state of the mobile electronic device 90. Lastly, the user 80 is likely not looking at the mobile electronic device 90 when the hacker's online purchase request is made, which will be indicated by the image sensor failing to detect the user 80's face. This creates further inconsistency between the expected state of the mobile electronic device 90 and the estimated actual state of the mobile electronic device 90.

Each inconsistency pertaining to the expected and estimated actual state of the mobile electronic device 90 effectively sends a "red flag" to the merchant 70 or the third party payment provider 60 that the requested transaction may be unauthorized. When there are enough red flags (for example 3 out of 5 sensor data parameters are inconsistent), or when one or more red flags are particularly alarming, the merchant 70 or the third party payment provider 60 may determine that the mobile electronic device 90 making the request is likely compromised. They may thereafter send an alert to the user 80, notifying the user 80 of suspicious activity taking place involving his/her mobile electronic device 90.

The user 80, who is previously unaware that the hacker 100 had surreptitiously gained access to the mobile electronic device 90, may then be able to take measures to reject the transaction. The user 80 may also take measures to beef up the security of his/her mobile electronic device 90 so as to prevent future hacking attempts. In addition, the merchant 70 or the third party payment provider 60 may deny (or temporarily hold) the request from the likely-compromised mobile electronic device 90, even if they do not immediately get a response from the user 80. By doing so, the hacker 100's attempt to exploit the mobile electronic device 90 may be timely detected and thwarted.

Based on the discussions above, it can be seen that the present disclosure allows for the creation of various profiles for typical sensor outputs during different types of transactions or activities involving the mobile electronic device 90. Each user 80's habits are different, so these profiles may be unique to each user 80 as well. An unauthorized transaction or activity involving the mobile electronic device 90 may be identified if the estimated state of the mobile electronic device deviates significantly from its expected state based on the profile.

In the illustrated embodiments, the entity (i.e., the merchant 70 and/or the third party payment provider 60) doing the modeling and fraud detection and prevention are entities located remotely from the mobile electronic device 90. However, the concepts discussed herein may also apply to scenarios where the mobile electronic device 90 itself may also possess the capabilities to do the risk modeling, fraud detection and prevention based on the sensor data.

Figure 2:
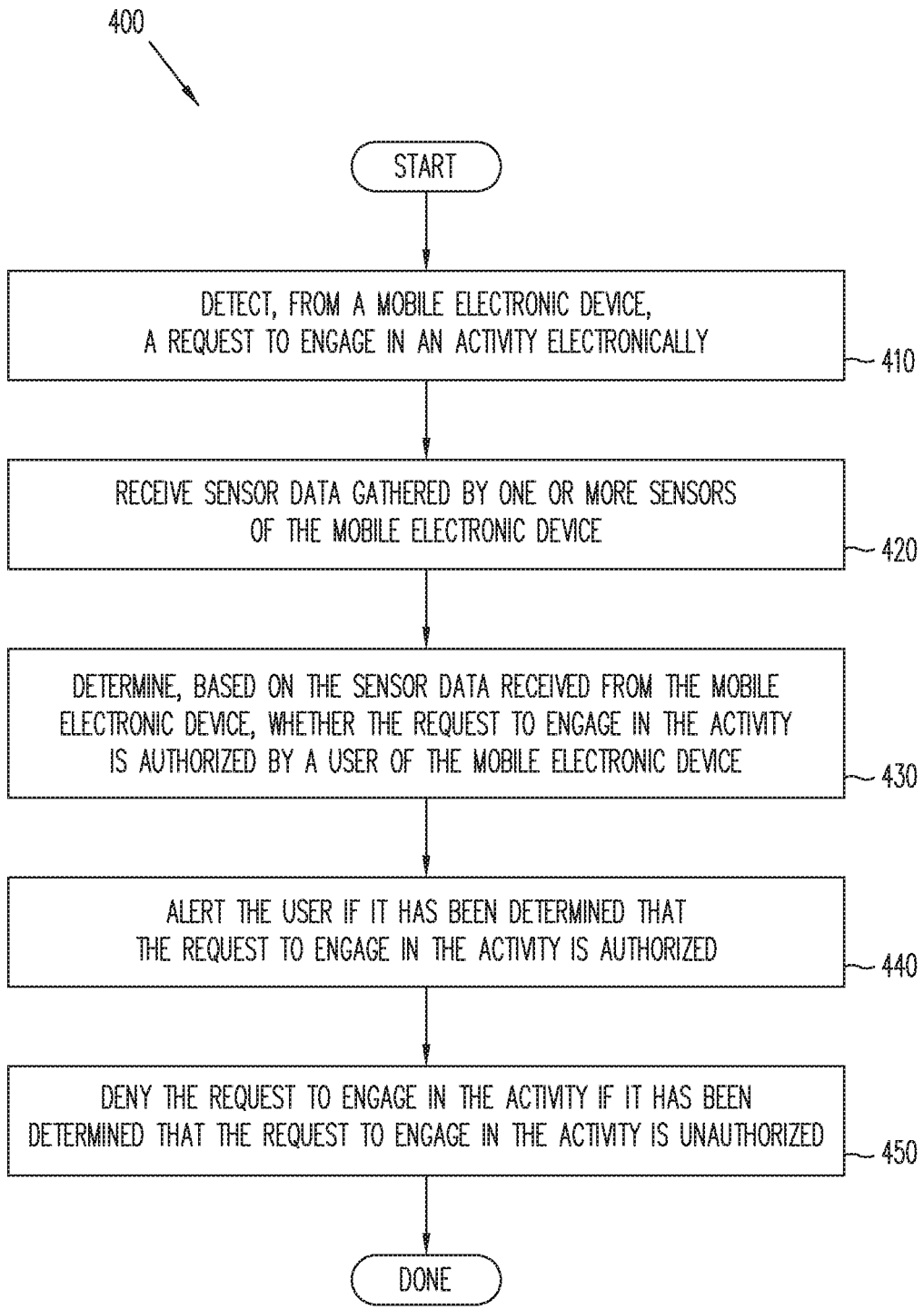
FIG. 2 is an example flowchart of detecting and verifying a transaction or activity involving a mobile electronic device according to various aspects of the present disclosure.

FIG. 2 is a flowchart illustrating a method 400 of verifying unauthorized access to a mobile electronic device. The method 400 includes a step 410, in which a request to engage in an activity electronically is detected. In some embodiments, the request includes a request to conduct a financial transaction electronically. In other embodiments, the request includes a request to access an account of the user.

The method 400 includes a step 420, in which sensor data gathered by one or more sensors of the mobile electronic device is received. In various embodiments, the sensors may include one or more of the following sensors: ambient light sensors, image sensors, proximity sensors, temperature sensors, location sensors, noise sensors, gyroscopes, accelerometers, barometers, and compasses.

It is understood that the step 410 may be performed before the step 420, or vice versa. In other words, the sensor data may be gathered before the request to engage in the activity electronically is received, or after the request is received.

The method 400 includes a step 430, in which it is determined whether the request to engage in the activity is authorized by a user of the mobile electronic device. The determination is made based on the sensor data received from the mobile electronic device. In some embodiments, the step 430 includes a step of analyzing the sensor data to estimate a state of the mobile electronic device at a time the request to engage in the activity is made, and a step of determining whether the estimated state of the mobile electronic device is consistent with an expected state of the mobile electronic device that is engaged in the activity. In some embodiments, the estimated state of the mobile electronic device is a function of the sensor data from at least two different types of sensors of the mobile electronic device. In some embodiments, the determination performed in step 430 involves making a determination of whether the mobile electronic device is being surreptitiously accessed when the request is made.

The method 400 includes a step 440, in which the user is alerted is it has been determined that the request to engage in the activity is unauthorized.

The method 400 includes a step 450, in which the request to engage in the activity is denied if it has been determined that the request to engage in the activity is unauthorized.

It is understood that at least some of the steps 410-450 are performed at least in part by one or more electronic processors of a system that is located remotely from the mobile electronic device. It is also understood that additional method steps may be performed before, during, or after the steps 410-440 discussed above. For example, the method 400 may include a step of establishing a model that correlates an expected state of the mobile electronic device with the activity specified in the request. The model may be established over time, by monitoring the state of the mobile electronic device (in terms of the sensor data collected, such as whether the mobile electronic device is moving or stationary, whether it is face up or down, whether a GPS signal is present, etc) and associating such state with the activity. It is also understood that one or more of the steps of the method 400 described herein may be omitted, combined, or performed in a different sequence as desired.

Figure 3:
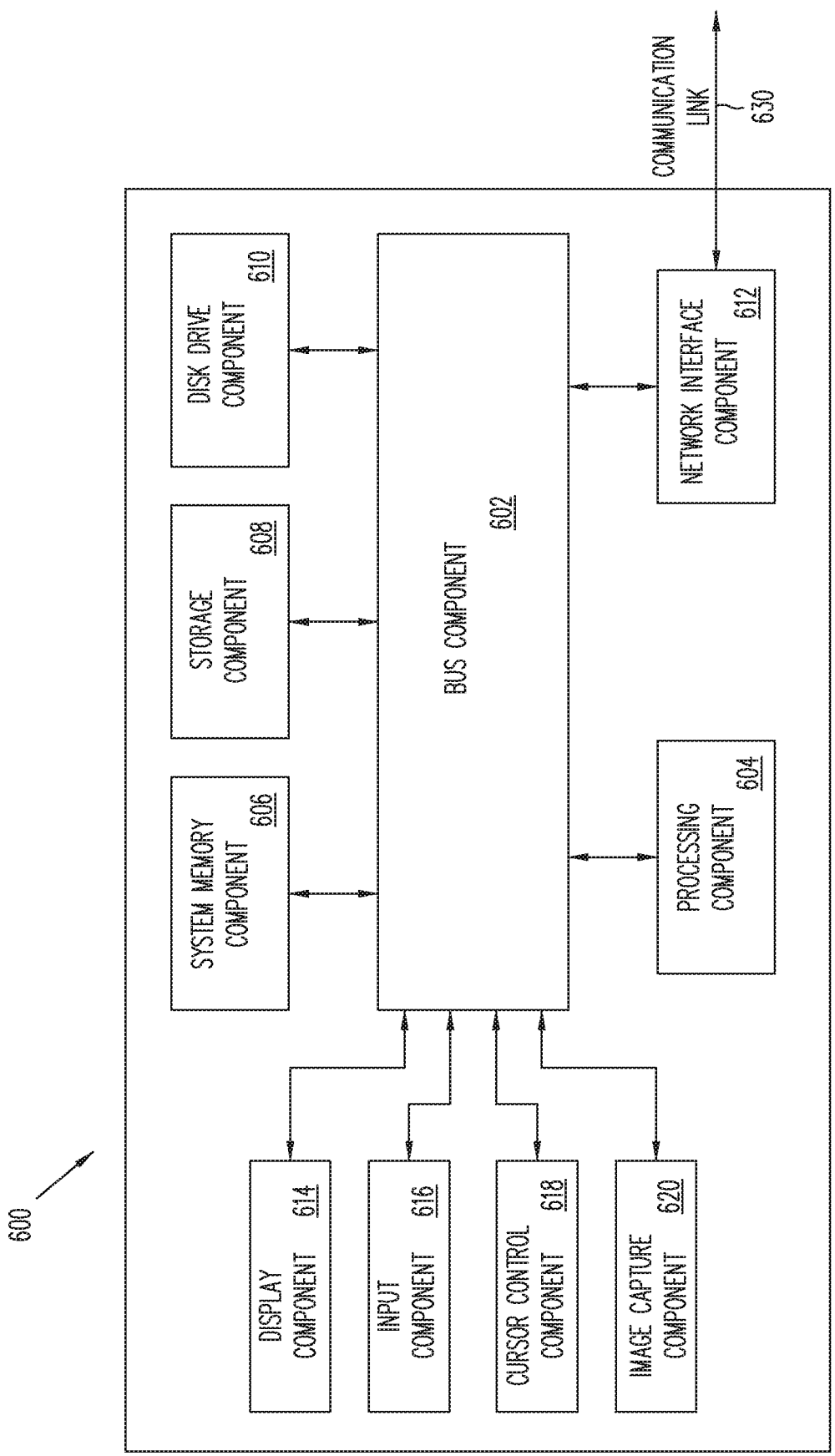
FIG. 3 is an example computer system for implementing the various steps of the method of FIG. 2 according to various aspects of the present disclosure

FIG. 3 is a block diagram of a computer system 600 suitable for implementing various methods and devices described herein, for example, the various method steps of the method 400. In various implementations, the devices capable of performing the steps may comprise a network communications device (e.g., mobile cellular phone, laptop, personal computer, tablet, etc.), a network computing device (e.g., a network server, a computer processor, an electronic communications interface, etc), or another suitable device. Accordingly, it should be appreciated that the devices capable of implementing the method 400 may be implemented as the computer system 600 in a manner as follows.

In accordance with various embodiments of the present disclosure, the computer system 600, such as a network server or a mobile communications device, includes a bus component 602 or other communication mechanisms for communicating information, which interconnects subsystems and components, such as a computer processing component 604 (e.g., processor, micro-controller, digital signal processor (DSP), etc.), system memory component 606 (e.g., RAM), static storage component 608 (e.g., ROM), disk drive component 610 (e.g., magnetic or optical), network interface component 612 (e.g., modem or Ethernet card), display component 614 (e.g., cathode ray tube (CRT) or liquid crystal display (LCD)), input component 616 (e.g., keyboard), cursor control component 618 (e.g., mouse or trackball), and image capture component 620 (e.g., analog or digital camera). In one implementation, disk drive component 610 may comprise a database having one or more disk drive components.

In accordance with embodiments of the present disclosure, computer system 600 performs specific operations by the processor 604 executing one or more sequences of one or more instructions contained in system memory component 606. Such instructions may be read into system memory component 606 from another computer readable medium, such as static storage component 608 or disk drive component 610. In other embodiments, hard-wired circuitry may be used in place of (or in combination with) software instructions to implement the present disclosure.

Logic may be encoded in a computer readable medium, which may refer to any medium that participates in providing instructions to the processor 604 for execution. Such a medium may take many forms, including but not limited to, non-volatile media and volatile media. In one embodiment, the computer readable medium is non-transitory. In various implementations, non-volatile media includes optical or magnetic disks, such as disk drive component 610, and volatile media includes dynamic memory, such as system memory component 606. In one aspect, data and information related to execution instructions may be transmitted to computer system 600 via a transmission media, such as in the form of acoustic or light waves, including those generated during radio wave and infrared data communications. In various implementations, transmission media may include coaxial cables, copper wire, and fiber optics, including wires that comprise bus 602.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 630 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 600 may transmit and receive messages, data, information and instructions, including one or more programs (i.e., application code) through communication link 630 and communication interface 612. Received program code may be executed by computer processor 604 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 4:
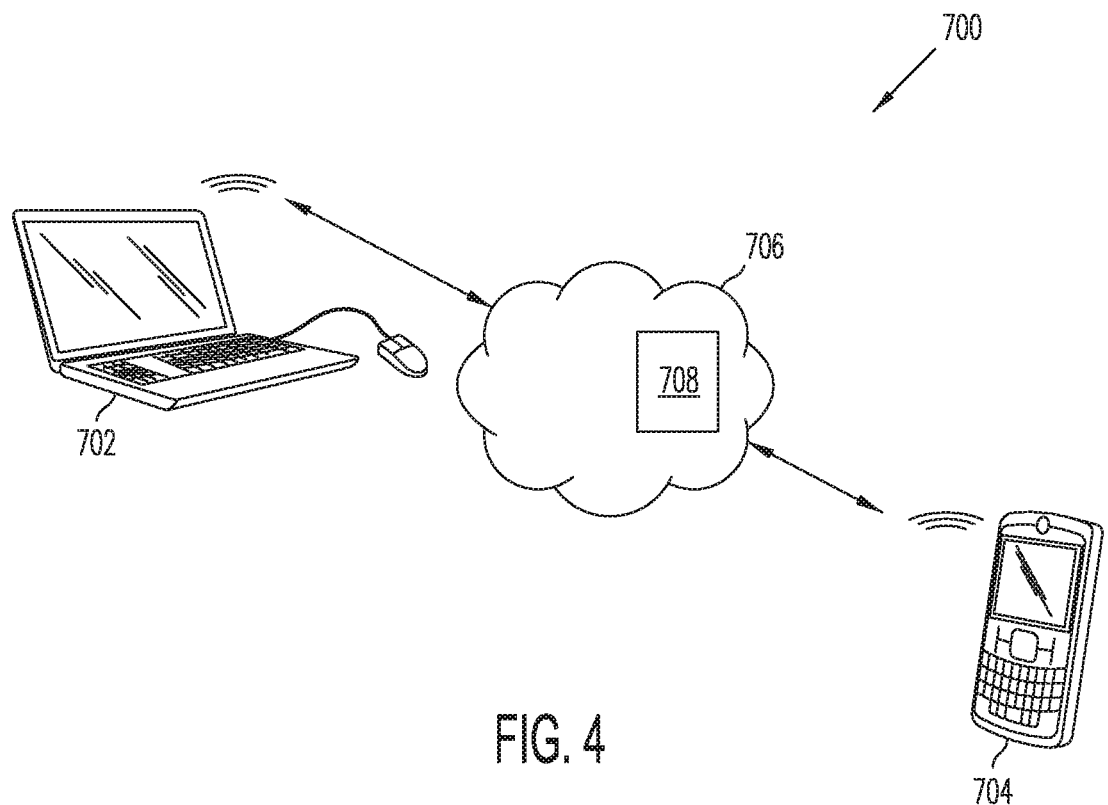
FIG. 4 is a simplified example of a cloud-based computing architecture according to various aspects of the present disclosure.

FIG. 4 illustrates an example cloud-based computing architecture 700, which may also be used to implement various aspects of the present disclosure. The cloud-based computing architecture 700 includes a mobile device 704 and a computer 702, both connected to a computer network 706 (e.g., the Internet or an intranet). In one example, a consumer has the mobile device 704, which is configured to run software to provide an app with functionalities described above with reference to FIGS. 1-3.

The mobile device 704 is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing and caching may be performed by the cloud-based resources 708. However, other divisions of responsibility are also possible in various embodiments.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702.

It is understood that the various components of cloud-based computing architecture 700 are shown as examples only. For instance, a given user may access the cloud-based resources 708 by a number of devices, not all of the devices being mobile devices. Similarly, a merchant or another user may access resources 708 from any number of suitable mobile or non-mobile devices. Furthermore, the cloud-based resources 708 may accommodate many merchants and users in various embodiments.

Figure 5:
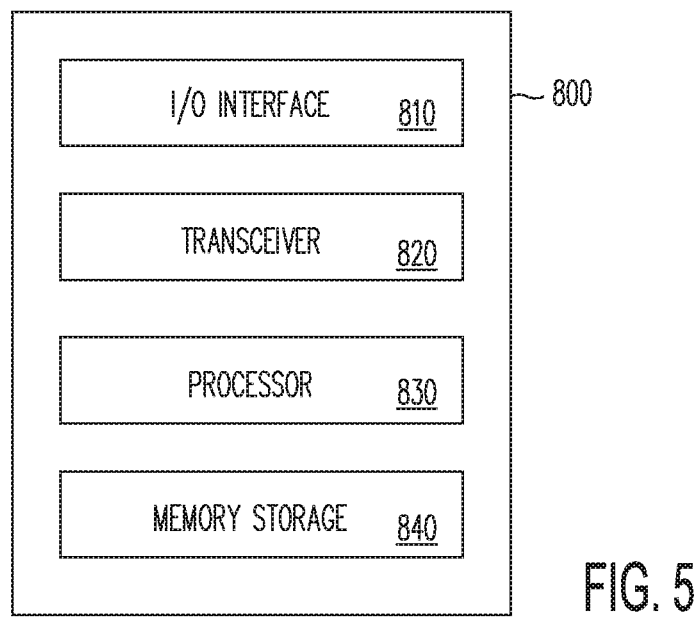
FIG. 5 is a simplified block diagram of an electronic system for implementing various methods and devices described according to various aspects of the present disclosure.

FIG. 5 is a simplified block diagram of an electronic system 800 for facilitating electronic commerce. For example, the electronic system 800 may be used by a third party payment provider to carry out the steps for detecting and preventing unauthorized access to a mobile electronic device discussed herein. In some embodiments, the electronic system 800 may include one or more computer servers operable to perform the method 400 of FIG. 2.

The electronic system 800 includes an input/output interface module 810. The interface module 810 is operable to receive an input from an external entity and communicate an output to the external entity. The external entity may include a merchant or a consumer. In an embodiment, the input/output interface module 810 includes a visual display unit. The input/output interface module 810 may also include physical and/or virtual buttons, keyboards, mouse, track balls, speakers, microphones, light-sensors, light-emitting diodes (LEDs), communications ports (such as USB or HDMI ports), joy-sticks, image-capture devices (for example cameras), etc.

The electronic system 800 includes a transceiver module 820. The transceiver module 820 contains various electronic circuitry components configured to conduct telecommunications with one or more external devices. The electronic circuitry components allow the transceiver module 820 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the transceiver module 820 includes antennas, filters, low-noise amplifiers, digital-to-analog (DAC) converters, analog-to-digital (ADC) converters, and transceivers. The transceiver module 820 may further include circuitry components such as mixers, amplifiers, oscillators, phase-locked loops (PLLs), and/or filters. Some of these electronic circuitry components may be integrated into a single discrete device or an integrated circuit (IC) chip.

The electronic system 800 also includes a computer processor module 830 that is operable to execute computer instructions. The computer processor module 830 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code.

The electronic system 800 includes a memory storage module 840. The memory storage module 840 may contain various forms of digital memory, such as hard disks, FLASH, SRAM, DRAM, ROM, EPROM, memory chips or cartridges, etc. Computer programming code may be permanently or temporarily stored in the memory storage module 840, for example. The processor module 830 may be used to execute the computer programming code stored in the memory storage module 840.

The memory storage module 840 also contains a program module that is configured to facilitate the electronic transactions according to the present disclosure. For example, the program module operates to provide actions, such as associate digital identifiers with merchandise items, detecting submissions of digital identifiers, and initiating reorders of the merchandise items associated with the digital identifiers, etc.

In some embodiments, the electronic system 800 may also be implemented on a portable electronic device such as a mobile telephone or a computer tablet.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a system. The system includes: a computer memory storage module configured to store executable computer programming code; and a computer processor module operatively coupled to the computer memory storage module, wherein the computer processor module is configured to execute the computer programming code to perform the following operations: detecting, from a mobile electronic device, a request to engage in an activity electronically; receiving sensor data gathered by one or more sensors of the mobile electronic device; determining, based on the sensor data received from the mobile electronic device, whether the request to engage in the activity is authorized by a user of the mobile electronic device; and alerting the user if it has been determined that the request to engage in the activity is unauthorized.

Yet another aspect of the present disclosure involves a method. The method includes: detecting, from a mobile electronic device, a request to engage in an activity electronically; receiving sensor data gathered by one or more sensors of the mobile electronic device; determining, based on the sensor data received from the mobile electronic device, whether the request to engage in the activity is authorized by a user of the mobile electronic device; and alerting the user if it has been determined that the request to engage in the activity is unauthorized; wherein at least one of the detecting, the receiving, the determining, and the alerting is performed at least in part by one or more electronic processors.

One more aspect of the present disclosure involves an apparatus that includes a non-transitory, tangible machine-readable storage medium storing a computer program. The computer program contains machine-readable instructions that when executed electronically by one or more computer processors, perform: detecting, from a mobile electronic device, a request to engage in an activity electronically; receiving sensor data gathered by one or more sensors of the mobile electronic device; determining, based on the sensor data received from the mobile electronic device, whether the request to engage in the activity is authorized by a user of the mobile electronic device; and alerting the user if it has been determined that the request to engage in the activity is unauthorized.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    detecting that a mobile device of a user has been used to engage in a first type of activity a plurality of times;
    determining, via one or more sensors of the mobile device, that a first physical status or a first electronic status is associated with the mobile device each time the mobile device was engaged in the first type of activity, wherein the first physical status or the first electronic status indicates: an acceleration of the mobile device, a shift in an orientation of the mobile device, the mobile device is moving, the mobile device is stationary, a change in ambient light, a Wi-Fi signal received from a same Wi-Fi source, or a presence of a Global Positioning System (GPS) signal;
    automatically associating, in response to the determining, the first type of activity with the first physical status or with the first electronic status for the mobile device;
    receiving, after the automatically associating, a request from the mobile device to engage in the first type of activity;
    obtaining, via the one or more sensors, a current physical status or a current electronic status of the mobile device;
    determining whether sensor data parameters for the current physical status exceeds a threshold for sensor data parameters for the first physical status or whether sensor data parameters for the current electronic status exceeds a threshold for sensor data parameters for the first electronic status; and
    selectively performing an action based on the determining whether the sensor data parameters for the current physical status exceeds the threshold for the sensor data parameters for the first physical status or whether the sensor data parameters for the current electronic status exceeds the threshold for the sensor data parameters for the first electronic status.

2. The method of claim 1, wherein the one or more sensors comprises an accelerometer.

3. The method of claim 1, wherein the one or more sensors comprises a light sensor.

4. The method of claim 1, wherein the one or more sensors comprises a gyroscope.

5. The method of claim 1, wherein the one or more sensors comprises a global positioning system (GPS) unit.

6. The method of claim 1, wherein the one or more sensors comprises a transceiver.

7. The method of claim 1, further comprising:
    detecting that the mobile device of a user has been used to engage in a second type of activity a second plurality of times;
    determining, via the one or more sensors of the mobile device, that a second physical status or a second electronic status is associated with the mobile device each time the mobile device was engaged in the second type of activity; and
    automatically associating, in response to the determining that the second physical status or the second electronic status is associated with the mobile device each time the mobile device is engaged in the second type of activity, the second type of activity with the second physical status or with the second electronic status for the mobile device.

8. The method of claim 1, wherein the action comprises denying the request in response to determining that the sensor data parameters for the current physical status does not meet or exceed the threshold for the sensor data parameters for the first physical status or that the sensor data parameters for the current electronic status does not meet or exceed the threshold for the sensor data parameters for the first electronic status.

9. The method of claim 1, wherein the action comprises sending an alert to the user in response to determining that the sensor data parameters for the current physical status does not meet or exceed the threshold for the sensor data parameters for the first physical status or that the sensor data parameters for the current electronic status does not meet or exceed the threshold for the sensor data parameter for the first electronic status.

10. The method of claim 9, wherein the alert comprises a notification that the mobile device is suspected of being accessed by unauthorized entity.

11. A system, comprising:
    a non-transitory memory storing instructions; and
    one or more hardware processors coupled to the non-transitory memory and configured to read the instructions from the non-transitory memory to cause the system to perform operations comprising:
        detecting that a mobile device of a user has been used to engage in a first type of activity a first plurality of times and a second type of activity a second plurality of times;
        determining, via one or more sensors of the mobile device, a first status for the mobile device each time the mobile device was engaged in the first type of activity and a second status for the mobile device each time the mobile device was engaged in the second type of activity, wherein the first status or the second status indicates: an acceleration of the mobile device, a change in an orientation of the mobile device, the mobile device is moving, a the mobile device is stationary, a change in ambient light, a Wi-Fi signal received from a same Wi-Fi source, or a presence of a Global Positioning System (GPS) signal;
        automatically associating, in response to the determining, the first type of activity with the first status and the second type of activity with the second status for the mobile device;
        receiving, after the automatically associating, a request from the mobile device to engage in the first type of activity or in the second type of activity;
        obtaining, via the one or more sensors, a current status of the mobile device;
        determining whether sensor data parameters for the current status exceeds a threshold for sensor data parameters for the first status or a threshold for sensor data parameters for the second status; and
        denying the request or sending an alert to the user in response to a determination that the sensor data parameters for the current status does not meet or exceed the threshold for the sensor data parameters for the first status or the threshold for the sensor data parameters for the second status.

12. The system of claim 11, wherein the determining comprises determining, via an accelerometer sensor of the mobile device, the acceleration of the mobile device each time the mobile device was engaged in the first type of activity or in the second type of activity.

13. The system of claim 11, wherein the determining comprises determining, via an ambient light sensor of the mobile device, the change in ambient light experienced by the mobile device each time the mobile device was engaged in the first type of activity or in the second type of activity.

14. The system of claim 11, wherein the determining comprises determining, via a gyroscope sensor of the mobile device, the change in the orientation of the mobile device each time the mobile device was engaged in the first type of activity or in the second type of activity.

15. The system of claim 11, wherein the determining comprises determining, via a GPS sensor of the mobile device, the mobile device remained stationary each time the mobile device was engaged in the first type of activity or in the second type of activity.

16. The system of claim 11, wherein the determining comprises determining, via a transceiver of the mobile device, that the mobile device receives the Wi-Fi signal from the same Wi-Fi source each time the mobile device was engaged in the first type of activity or in the second type of activity.

17. A method, comprising:
    detecting, from a mobile electronic device, a request to engage in an electronic transaction;
    accessing a model that describes an expected state of the mobile electronic device when conducting a same type of the electronic transaction in the past;
    receiving sensor data gathered by one or more sensors of the mobile electronic device;
    analyzing the received sensor data to estimate a present state of the mobile electronic device at a time of the request;
    comparing the estimated present state of the mobile electronic device to the expected state of the mobile electronic device;
    determining, based on the comparing, whether the mobile electronic device: experienced an acceleration, experienced a shift in an orientation, is moving, is stationary, experienced a change in ambient light, or is receiving a Wi-Fi signal from a predetermined Wi-Fi source; and
    processing the request based on the determining, wherein the processing comprises sending an alert to a user of the mobile electronic device in response to the estimated present state of the mobile electronic device exceeding a threshold deviation from the expected state of the mobile electronic device.

18. The method of claim 17, wherein the one or more sensors comprises: an accelerometer, an ambient light sensor, a gyroscope, a Global Positioning System (GPS) unit, or a transceiver.

19. The method of claim 17, wherein the processing further comprises denying the request to engage in the electronic transaction in response to the estimated present state of the mobile electronic device exceeding a threshold deviation from the expected state of the mobile electronic device.

20. The method of claim 17, further comprising, before the detecting: building the model based on determining one or more states of the mobile electronic device during previous electronic transactions conducted using the mobile electronic device.

* * * * *